(12) United States Patent
Ryan

(10) Patent No.: US 6,381,367 B1
(45) Date of Patent: Apr. 30, 2002

(54) METHOD AND APPARATUS FOR COMPRESSION COMPATIBLE VIDEO FINGERPRINTING

(75) Inventor: John O. Ryan, Cupertino, CA (US)

(73) Assignee: Macrovision Corp., Sunnyvale, CA (US)

( * ) Notice: Subject to any disclaimer, the term of this patent is extended or adjusted under 35 U.S.C. 154(b) by 0 days.

(21) Appl. No.: 09/171,763
(22) PCT Filed: May 29, 1997
(86) PCT No.: PCT/US97/09211
   § 371 Date: Oct. 23, 1998
   § 102(e) Date: Oct. 23, 1998
(87) PCT Pub. No.: WO97/46012
   PCT Pub. Date: Dec. 4, 1997
(51) Int. Cl.[7] ................................................. G06K 9/36
(52) U.S. Cl. ....................... 382/232; 382/116; 382/124; 382/125; 382/126
(58) Field of Search ........................... 382/232, 116, 382/124, 125, 126, 224; 283/68, 67, 85; 356/71; 348/36; 345/547

(56) References Cited

U.S. PATENT DOCUMENTS

| 5,018,767 A | * | 5/1991 | Wicker | 283/67 |
| 5,193,853 A | * | 3/1993 | Wicker | 283/85 |
| 5,513,260 A | * | 4/1996 | Ryan | 380/3 |
| 5,659,613 A | * | 8/1997 | Copeland et al. | 380/3 |
| 5,686,957 A | * | 11/1997 | Baker | 348/36 |
| 5,739,864 A | * | 4/1998 | Copeland | 348/473 |
| 5,914,711 A | * | 6/1999 | Mangerson et al. | 345/547 |
| 5,982,932 A | * | 11/1999 | Prokoski | 382/224 |

FOREIGN PATENT DOCUMENTS

EP 0690595 * 1/1996 ............. H04L/9/18

* cited by examiner

Primary Examiner—Jose L. Couso
Assistant Examiner—Anh Hong Do
(74) Attorney, Agent, or Firm—George Almeida

(57) ABSTRACT

Fingerprinting and fingerprint detection, techniques are described which, unlike typical fingerprint systems used to conceal video signals, are compatible with all conceivable forms of signal compression systems while still allowing viewing of the video signal. The fingerprint technique is based on the principle of applying very slight local spatial distortion to the pixels in a video image, and the like, by means of selected warp patterns. Thus the technique provides means for conveying, within the video signal, selected information in the form of the fingerprint which is detectable electronically but which is not noticeable to a critical viewer who is watching the video signal. That is, the resultant fingerprinted video signal will appear to be identical to the undistorted video signal. the fingerprint detection technique provides for the recovery of the conveyed information which may comprise an instruction to prevent the fingerprinted video image from being copied, messages which allow identifying the source and date of an unauthorized copy of the video image, etc.

31 Claims, 3 Drawing Sheets

METHOD AND APPARATUS FOR COMPRESSION COMPATIBLE VIDEO FINGERPRINTING

CROSS REFERENCE TO RELATED APPLICATIONS

This application is related to U.S. Pat. No. 5,659,613 ('613) issued Aug. 1997 entitled Method and Apparatus for Copy Protection for Various Recording Media Using a Video Finger Print, by John O. Ryan and Gregory C. Copeland, to U.S. Pat. No. 5,513,260 ('260) issued Apr. 30, 1996 entitled Method and Apparatus for Copy Protection for Various Recording Media, by John O. Ryan, and to U.S. Pat. No. 5,739,864 ('864) issued Apr. 14, 1998, entitled A Video Finger Print Method and Apparatus, by Gregory C. Copeland. This application also is related to copending patent application Ser. No. 09/171,856, filed May 29, 1997; entitled Method and Apparatus for Compression Compatible Video Scrambling, by John O. Ryan.

BACKGROUND OF THE INVENTION

There are two prior patent applications of mention above which discuss video fingerprint methods for video signals. The '864 application by G. C. Copeland discloses a video fingerprint method that inserts a low frequency low level signal within the video signal, such that is not observable to the viewer, but is readily detectable by a special detection circuit. This low level signal operates over many fields in a manner that makes it possible to detect and identify the source of the signal. The disadvantage of '864 prior art is that the fingerprint method may not be compatible with certain video compression systems. The '613 application by J. O. Ryan and G. C. Copeland uses the concepts of the '260 patent application for a scrambling system for various recording media.

EPO Application 0 690 595 describes a method and apparatus that encodes identification information into a stream of digital data representing an object. The digital data representing an object is modified to add embedded identification information into the data. This modification is done such that the resultant changes to the object are not objectionable to the user. By comparing the original data to the modified data, the possessor of the original data can recover the embedded identification information. However the identification information is effectively unavailable to anyone not possessing the original data.

There is a need for a secure video fingerprint method having the property that the fingerprinted video be compatible with the various video compression systems currently in use. In particular, it should be compatible with compression systems based on for example the Discrete Cosine Transform (DCT), which may employ inter-field redundance coding. Motion picture experts group (MPEG-1 and MPEG-2) are examples of such compression systems. In anticipated applications, the video signal generally is subjected to the processes of fingerprinting, compression, decompression and fingerprint detection—in that order. The fingerprinted video therefore will be subjected to the processes of compression and decompression prior to fingerprint detection.

The fingerprint systems of previous mention may tend to disturb the inter-field redundancy in a television signal that the compression systems of previous mention depend upon for proper operation. When the inter-field redundancy is disturbed, the bit rate requirements for the compression system rise, possibly to an unacceptable level, for the transmission path of the compressed video signal. Therefore there is need for a fingerprint system that does not degrade the inter-field redundancy to a level that requires excessive bit rates to provide a given picture quality.

SUMMARY OF THE INVENTION

The present invention provides a fingerprint method and apparatus which overcomes the compression system incompatibility of the prior art fingerprint systems of previous mention, while further meeting other various desirable requirements such as not being observable to a viewer while conveying information in the active video signal.

In addition, the present invention meets requirements such as the following:

Video Standards

The fingerprint method and apparatus of the invention is applicable to either analog (NTSC, PAL, SECAM) or digital (CCIR-601) video signals.

Security

The present fingerprint method and apparatus intrinsically provides a high level of resistance to hacking. In other words, it is very difficult to remove the fingerprint from the video.

Invisibility

The present fingerprint method and apparatus primarily is intended to convey information in entertainment applications such as video movies, television (TV) shows, and the like. It is essential that the fingerprint method not affect the entertainment value of the video image while being securely concealed within the image, but must be readily detectable by, for example, a detection circuit in a disk or tape recorder or other signal processing apparatus.

General Video System Compatibility

In addition to the foregoing requirements and attendant advantages, for maximum operational flexibility, the invention ensures that the fingerprinted video signal appears as a normal video signal to most if not all video processing methods and devices designed to operate with unfingerprinted video signals, and the like.

In particular, the video signal's fingerprinted in accordance with the invention is compatible with all video recording, transmitting and processing devices likely to exist in a production or editing environment. Passage of the fingerprinted video through these devices does not cause the fingerprint to be removed or be made more difficult to detect.

Further, the present fingerprint method and apparatus, or at least a particular embodiment thereof, is compatible with consumer video cassette recorders (VCRs). That is, the invention makes it possible to record the fingerprinted video signal on a consumer grade VCR, and replay it later for detection without any likelihood of it being removed during the record/replay process.

More particularly, the invention provides a library of warp patterns, each of which is capable of imparting a selected degree of local spatial distortion to a video image. In response to an operator's selection, a pattern select code determines which stored warp pattern is supplied as a fingerprint signal to a warp engine. The warp engine in turn applies the selected warp pattern to the video image to correspondingly locally spatially distort the image. The slight distortion imparted by the selected warp pattern is not observable to a viewer, but is detectable by a circuit in a recording device to, for example, prevent the recording device from copying the video signal. Alternatively, the fingerprint also allows subsequently comparing the original unfingerprinted video signal and an unauthorized copy of the fingerprinted video signal, to determine the origin, date, etc., of the unauthorized copy. For example, in the event a fingerprinted video signal is illegally recorded onto a disk or tape, the spatial distortion imparted by the fingerprint technique remains with the recorded video image. Thus a subsequent comparison between the pixel positions of a fingerprinted signal (that is, an illegal copy) and the unfingerprinted original signal, can be used to identify the source of the illegal copy.

DETAILED DESCRIPTION OF THE INVENTION

Figure 1:
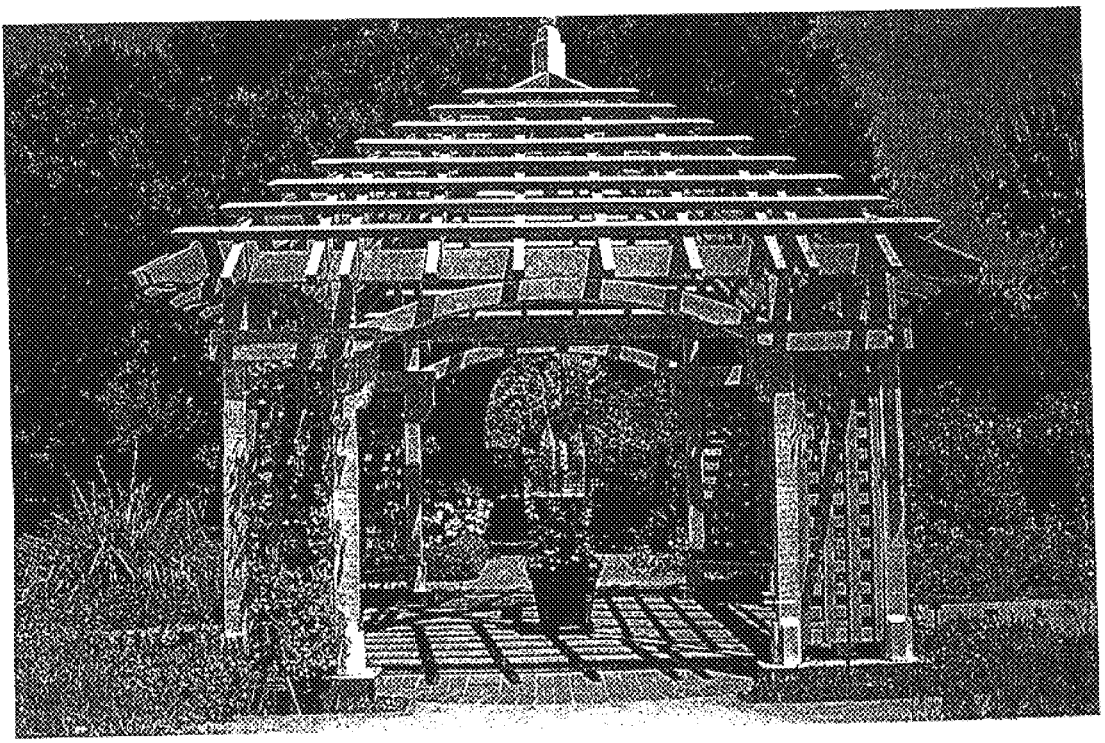
FIG. 1 is a photograph of an image in which a fingerprint has not been applied by the invention.

The present invention provides a method and apparatus for fingerprinting, via a signal fingerprinting technique, various program distribution media such as digital video disk (DVD) or digital video cassette recorder (DVCR), as well as broadcast and cable video distribution channels.

A compression system such as, for example, MPEG 1 and 2 of previous mention, relies on the condition that a high degree of redundancy exists in the image, both intra-field and inter-field redundancy.

The invention employs the same basic spatial image distortion concept as disclosed in the above-mentioned related application entitled Method and Apparatus for Compression Compatible Video Scrambling, by J. O. Ryan. However, the present invention applies a much smaller distortion which can still be detected by a suitable circuit and which will not be noticeable to a viewer.

The explanation of the invention method and apparatus is facilitated by the following analogy. Consider a scene viewed through a sheet of colorless transparent glass with a slightly bumpy surface. By specifying very slight"bumpiness" parameters, the resultant image will appear to be identical to the undistorted image, although the positions of the specific pixels in the image are slightly shifted relative to their normal positions. In effect, the applied fingerprint does not distort the image visibly, but the small distortion may still be readily detectable by a suitable detector circuit. For example, a recorder having this fingerprint detector circuit could be prevented from copying the fingerprinted video signal. Thus, in effect the fingerprint added to the video signal is a means for conveying a message or instruction which, in the above example, instructs the recorder to not copy the video signal. Alternatively, in the event that an illegal copy of the fingerprinted video signal is found, the message conveyed can be used to identify the source of the illicit copy, the date of recording, or other information.

Although the present invention conveys information within the video signal, the fingerprint technique is compatible with all conceivable forms of compression systems because the application of the fingerprint does not materially increase the information content of the video signal. The various pixels may be very slightly closer or further from each other in any direction. Thus it follows that the high frequency content or detail is very slightly increased and decreased in various areas of the image, but there is no noticeable change in the bit rate of the compressed (or uncompressed) signal.

Thus, the technique of the invention is based upon a"local spatial distortion" of the active video signal. More particularly, the invention comprises a particular kind of optical image scrambling which when modeled in the video domain becomes the basis of a video fingerprint system having all of the desirable properties and requirements, and thus the attendant advantages, of previous mention.

To this end, a video processing means for providing the fingerprint method and apparatus of the invention, embodies a slight local spatial image distortion of a video signal which is not visually noticeable and which is electronically detectable. Such a device is referred to herein as a spatial image distortion (SID) fingerprint inserter having the following properties:

displacement of each pixel of the original image by a slight amount unnoticeable to the eye (which may be zero) horizontally and/or vertically.

maintaining a given pixel in the fingerprinted image with the same set of contiguous pixels that it had in the original image.

An array of number pairs, one pair for each pixel, is needed to describe the fingerprint signal for each field. The field fingerprint signal, herein termed a"warp" pattern for ease of description, may be arranged to remain fixed for relativity long periods, to change slowly with time, or to change from field to field. By appropriate choice of warp patterns and by limitation of their range so as to be detectable electronically but not visually noticeable, it is possible to effect a fingerprint system having all of the properties and requirements specified above.

There are an infinite number of warp patterns available each of which designates the amount of displacement horizontally and vertically of each pixel in the image. The warp pattern can be fixed for an entire movie or vary throughout the movie.

In one application of the invention the warp pattern remains unchanged throughout the entire movie or program, and that particular pattern may designate a particular copy, or the broadcast time and source, of the program for broadcast application. If illicit copies of the program are discovered later, these copies may be compared with the original unwarped program in a suitable correlating device which identifies the specific warp pattern used, to thereby identify the source of the illicit copy.

For this application, the warp pattern can be"morphed" from one pattern to another, or can be faded to zero warp and back again, preferably gradually over a selected time interval such as a number of frames up to a longer time interval of a plurality of seconds. The purpose for applying changing warp patterns is to increase the level of security, that is, to make it even more difficult for unauthorized persons to discover the identify of the warp pattern and thus override the fingerprint process.

Figure 3:
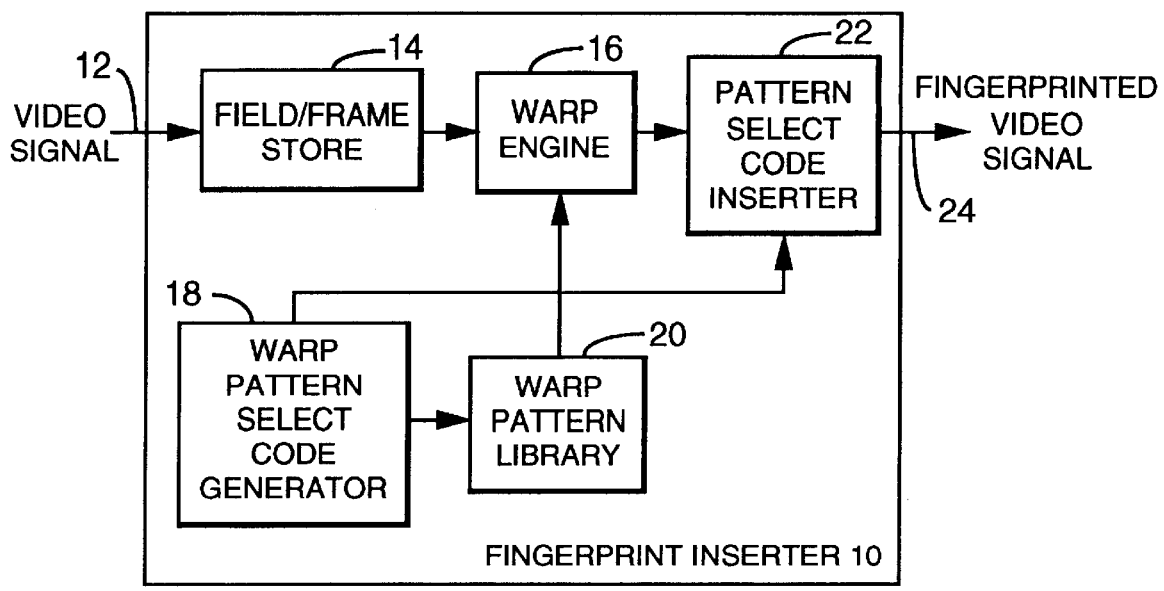
FIG. 3 is a block diagram illustrating an embodiment of a fingerprint apparatus in accordance with the invention.

In another application the teachings of the present invention may be used to convey FIG. 3 illustrates an embodiment of a fingerprint apparatus of the invention herein referred to as a fingerprint inserter 10. A digital video signal or the like is supplied to a field/frame store 14 via an input lead 12. The field/frame store 14 provides means to store a field or frame of video and to supply the video to a first input of a warp engine 16. In response to a user selection, a warp pattern select code generator 18 generates a warp pattern select code which, in turn, selects a desired warp pattern from a warp pattern library 20 which may include for example a look up table. The selected warp pattern is supplied as a fingerprint signal to a second input of the warp engine 16. The warp pattern is applied by the warp engine to distort accordingly the pixel positions in the appropriate lines of the field or frame of video from the field/frame store 14. The output of the wrap engine 16 consists of the fingerprinted video signal which is supplied to a pattern select code inserter circuit 22. Circuit 22 inserts a code identifying the selected pattern into the fingerprinted video signal, which then is coupled via an output lead 24 to any downstream digital processing circuits and/or devices used in the associated video processing application.

For example, a particular SID pattern may be used which generates a slight vertical nonlinearity in the scene, such that while the center of the image is held fixed, the top and bottom regions are caused to meander vertically about their proper locations at a predetermined rate. The amount of the displacement may be a fraction of a percent of picture height so as to be invisible, and the rate of change may be, say, one cycle per second. instructions to a device such as, for example, a video recording device.

FIG. 3 illustrates an embodiment of a fingerprint apparatus of the invention herein referred to as a fingerprint inserter 10. A digital video signal or the like is supplied to a field/frame store 14 via an input lead 12. The field/frame store 14 provides means to store a field or frame of video and to supply the video to a first input of a warp engine 16. In response to a user selection, a warp pattern select code generator 18 generates a warp pattern select code which, in turn, selects a desired warp pattern from a warp pattern library 20 which may include for example a look up table. The selected warp pattern is supplied as a fingerprint signal to a second input of the warp engine 16. The warp pattern is applied by the warp engine to distort accordingly the pixel positions in the appropriate lines of the field or frame of video from the field/frame store 14. For example, a particular SID pattern may be used which generates a slight vertical monlinearity in the scene, such that while the ccenter of the image is held fixed, the top and bottom regions are caused to meander vertically about their proper locations at a predetermined rete. The amount of the displacement may by a fraction a percent of picture height so as to be invisible, and the rate of change may be, say, one cycle per second.

Figure 2:
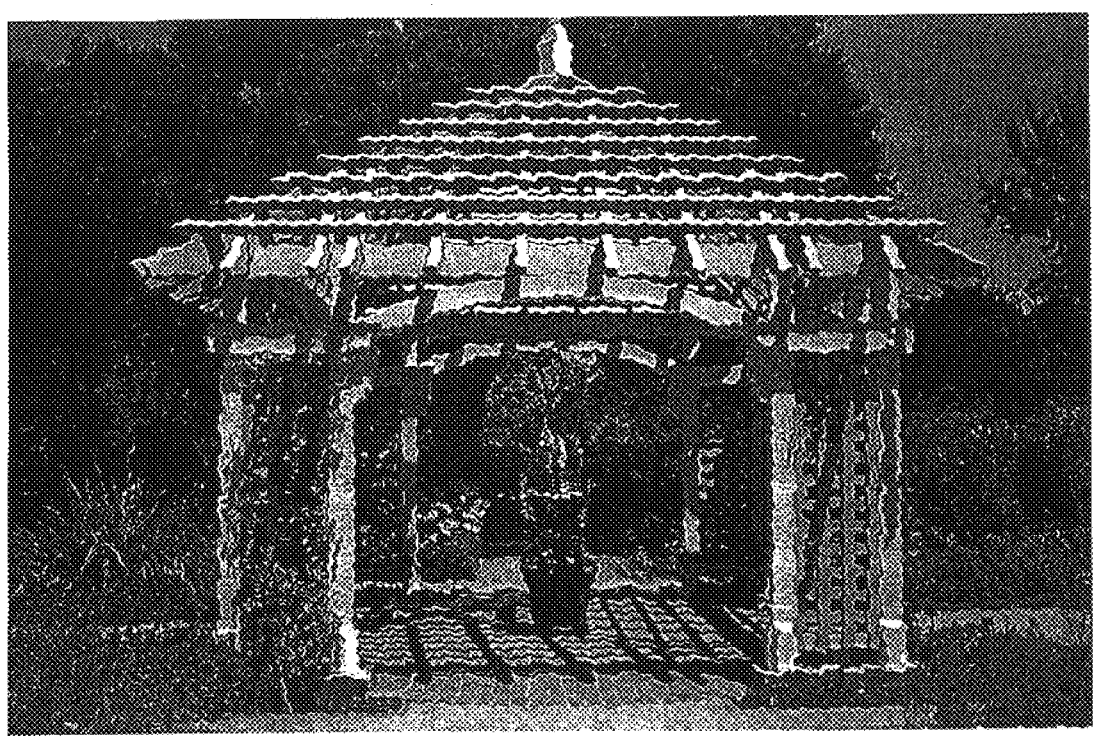
FIG. 2 is a photograph of an image in which a fingerprint has been applied in accordance with the invention.

FIGS. 1 and 2 illustrate an original picture or video image without a fingerprint and a video image with the addition of a fingerprint, respectively, in accordance with the present invention. As may be seen in FIG. 2, the application of a warp pattern does not cause a visually noticeable distortion in the image.

Figure 4:
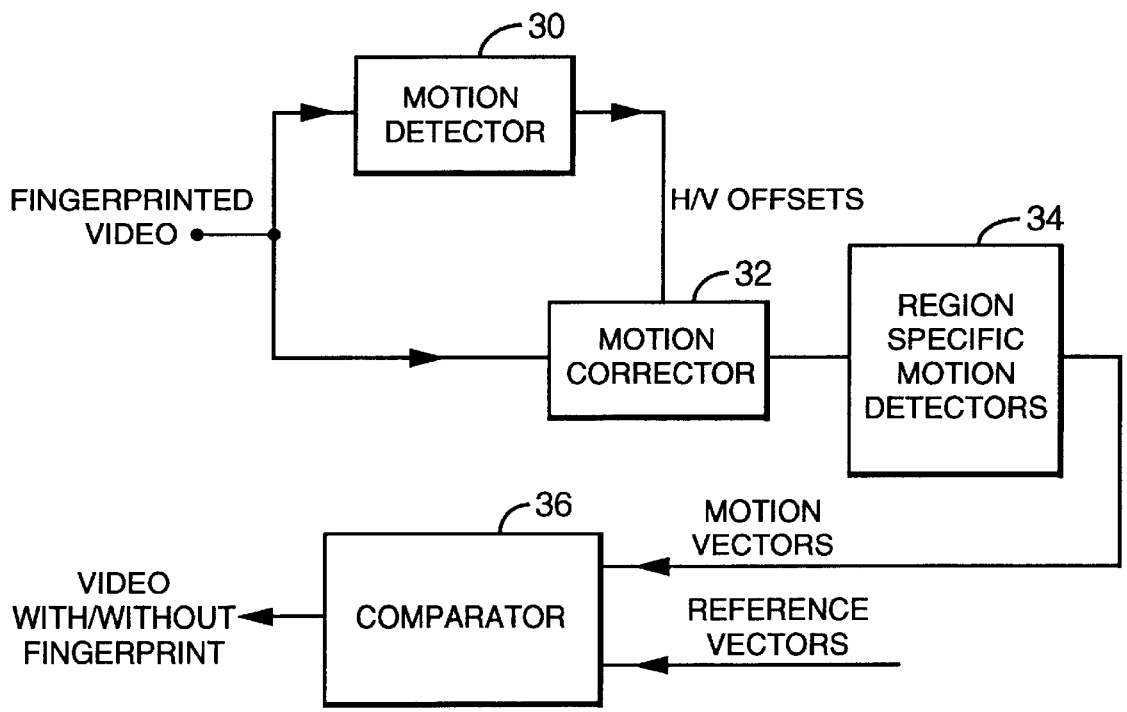
FIG. 4 is a block diagram illustrating an embodiment of a fingerprint detection apparatus in accordance with the invention.

A suitable detector may be constructed as shown in FIG. 4. Firstly, in order to minimize the effect of normal scene movements, a motion detector 30 examines the edges and the center region of the image for movement and applies a compensating correction via a motion corrector 32 to the video, which then is fed to a SID detector 34. In the event that large changes are detected, the measurement process is temporarily halted. This makes it easier for the SID detector to detect the SID pattern in the presence of normal scene motion. The motion-compensated video is thus subjected to motion detection in only those regions affected by the SID pattern, in this case regions near the top and bottom of the image. The resulting motion vectors are examined in a comparator 36 for correspondence both in magnitude and time with reference vectors expected for the particular SID pattern used, and if a correspondence is found the "fingerprint" has been detected.

For example, a particular SID pattern may be used which generates a slight vertical nonlinearity in the scene, such that while the center of the image is held fixed, the top and bottom regions are caused to meander vertically about their proper locations at a predetermined rate. The amount of the displacement may be a fraction of a percent of picture height so as to be invisible, and the rate of change may be, say, one cycle per second.

A suitable detector may be constructed as shown in FIG. 4. Firstly, in order to minimize the effect of normal scene movements, a motion detector examines the edges and the center region of the image for movement and applies a compensating correction to the video fed to the SID detector. In the event that large changes are detected, the measurement process is temporarily halted. This makes it easier for the SID detector to detect the SID pattern in the presence of normal scene motion. The motion-compensated video is then subjected to motion detection in only those regions affected by the SID pattern, in this case regions near the top and bottom of the image. The resulting motion vectors are examined for correspondence both in magnitude and time with the vectors expected for the particular SID pattern used, and if a correspondence is found the "fingerprint" has been detected.

In one this embodiment, the fact that the video has undergone spatial image distortion according to some prearranged pattern and/or timetable is used to indicate the source of an illicit copy. The various sources or prints of the original video are subjected to different SID patterns which uniquely identify the source or the print. At a later time, if an illicit copy of the program surfaces, it will be possible to identify the source or print from which this copy was made.

To do this, the original video (from an archive) is compared with the illicit copy. The two video signals are first frame-synchronized and the signal levels are adjusted to be equal. Any horizontal or vertical offsets between the two images are also corrected for using simple subtraction techniques to show up difference.

In one embodiment of the invention, the SID may be applied only to specific segments of the video program. In another embodiment, a specific SID pattern may be faded in and out according to a specific timetable. Or both embodiments may be combined to increase the possible permutations. In an example of the latter, a particular SID pattern may be used which generates a slight horizontal nonlinearity in the scene, such that while both sides of the image remain fixed, the center meanders to the left and right of its proper location at a predetermined rate. Furthermore, only certain time segments of the program are subjected to this distortion. An operator viewing the subtracted images on a monitor can easily see this SID pattern, note the time segments when it occurs and its rate of change, and thereby identify the source of the illicit copy. Although the invention has been described herein relative to specific embodiments, various additional features and advantages will be apparent from the description and drawings. For example, the invention techniques may be applied to a medium other than video signals, such as, for example, photographs, computer generated images, etc. By way of example, the local spatial distortion technique can be used to identify the origin of illegal copies of proprietary photographs. To this end, as described above, a negative of a photograph may be electronically reproduced several times using a slightly different warp pattern each time by altering the scanning beam very slightly. Each resulting new negative thus contains a different fixed spatial distortion which can be detected subsequently in accordance with the invention as described above to identify the photograph and thus the source of any illegal copies thereof.

Thus the scope of the invention is defined by the following claims and their equivalents.

What is claimed is:

1. A method of conveying specific information in a video image and the like, without visually degrading the video images comprising the steps of:
   providing a predetermined warp pattern commensurate with a selected very slight local spatial distortion to be applied to the video image;
   applying the selected very slight local spatial distortion to the video image to locally very slightly displace selected portions of the image with respect to their normal locations by an amount that is unnoticeable to a viewer but which represents the specific information, in response to the warp pattern;
   wherein the pattern of said very slight local spatial distortion is compatible with signal compression processes; and
   detecting the specific information conveyed in the video image by comparing the selected very slight local spatial distortion in the conveyed video image with the undistorted original video image to recover the specific information such as the originating source, the date of the image and/or whether the image is not to be copied.

2. The method of claim 1 including the step of:
   storing a multiplicity of predetermined warp patterns each commensurate with selected different patterns of very slight local spatial distortions, wherein each pattern represents the specific information such as the different originating source, date of the image and/or whether the image is to be copied, said different patterns to be applied to video fields of respective versions of the video image.

3. The method of claim 2 wherein the selected portions correspond to pixels, and the different warp patterns of the very slight local spatial distortions applied to the pixels of the video image renders the conveyed video image watchable while being electronically detectable.

4. The method of claim 3 including the step of:
   retaining information which identities the predetermined warp pattern and thus the specific very slight local spatial distortion used, to allow subsequent identification of a copy of the conveyed video image.

5. The method of claim 2 wherein there are a successive plurality of changing video images over a period of time, wherein a fixed warp pattern is applied to the plurality of images over the period of time.

6. The method of claim 2 wherein there are a successive plurality of changing video images over a period of time, wherein changing warp patterns are applied to the plurality of images over the period of time.

7. The method of claim 6 wherein the warp patterns change slowly over a time period of from a field to several seconds of time.

8. The method of claim 2 including the steps of:
   applying a different warp pattern to each version of the video image to provide each version with different specific information which identifies the thusly fingerprinted video image;
   detecting the different specific information in each of the respective fingerprinted versions; and
   comparing the different detected specific information of respective fingerprinted versions of the video image with the unfingerprinted original video image to identify an illicit copy of the video image.

9. The method of claim 1 including:
   supplying the original video image in the form of a two-dimensional array of pixels; and
   wherein the step of applying includes locally spatially displacing very slightly the pixels within the array while retaining inter-pixel relationships, in response to a predetermined warp pattern, to provide a fingerprinted video image in which the specific information is conveyed.

10. The method of claim 9 wherein the step of applying further includes the steps of:
    displacing each pixel of the video image by the selected very slight amount, beginning with zero amount, horizontally and/or vertically to represent the specific information to be conveyed; and
    maintaining the compatibility with signal compression processes by maintaining a given pixel in the displaced pixels within the same set of contiguous pixels that it had in the original video image.

11. The method of claim 10 wherein the pixels are displaced a selected fraction of a pixel.

12. The method of claim 9 wherein the fingerprinted video image is delivered via a delivery networks, including the steps of:
    detecting the pixel spatial displacements between the undistorted original video image and an illicit copy of the delivered fingerprinted video image; and
    wherein the displacements correspond to the fingerprint and comprise the specific information conveyed with the video image.

13. The method of claim 12 including the step of:
    comparing the pixel spatial displacements with a multiplicity of the predetermined different warp patterns to determine the warp pattern corresponding to the fingerprint contained in the illicit copy, to identify the originating source and/or the date of the illicit copy.

14. The method of claim 9 wherein the fingerprinted video image is delivered as a succession of video fields containing the specific information, including the steps of:
    detecting the fingerprint in the video image by detecting the very slight local pixel displacements in the fields of video; and
    preventing the delivered fingerprinted video image from being copied in response to the step of detecting the fingerprint.

15. Apparatus for conveying specific information in video data and the like, without visually degrading the video data, comprising:
    means for generating a warp pattern select code commensurate with a selected very slight local spatial distortion to be applied to the video data;
    means responsive to the warp pattern select code for applying a corresponding selected warp pattern to the video data to effect the selected very slight local spatial distortion as specific very slight local spatial displacements of portions of the video data from their normal locations; and
    a receiving facility for detecting the specific information conveyed in the video data by comparing the specific very slight local spatial displacements with the undistorted original video data.

16. The apparatus of claim 15 wherein the data comprises fields of video, and the means for applying includes:
    memory means for storing a plurality of selected warp patterns;
    means responsive to the memory means for applying a specific warp pattern to one or more fields; and wherein the selected warp patterns each provide a different very slight local spatial distortion indicative of a conveyed specific information, which distortion is unnoticeable in the video data while being detectable electronically.

17. The apparatus of claim 16 wherein each of the very slight local spatial distortions applied by the respective warp patterns comprises a fingerprint which represents the specific information conveyed within the video data itself, and wherein the fingerprints are compatible with signal compression processes.

18. The apparatus of claim 17 wherein the fingerprinted video data is selectively delivered to the receiving facility, including:

means receiving the fingerprinted video data for preventing the copying of the video data in response to the specific information conveyed via the fingerprint in the video data.

19. The apparatus of claim 15 including:

a field/frame store for storing and providing fields or frames of the video data, wherein a field or frame comprises a two-dimensional array of pixels;

memory means comprising a warp pattern library for storing a multiplicity of warp patterns each of which imparts a different pattern of distortion representing a specific information to said array of pixels; and said generating means supplies to said applying means a selected warp pattern commensurate with a respective fingerprint, from the multiplicity of warp patterns stored in the warp pattern library.

20. The apparatus of claim 19 wherein said generating means supplies to the applying means a selected succession of changing warp patterns over a predetermined period of time.

21. The apparatus of claim 19 wherein the applying means includes:

a warp engine receiving said array of pixels and responsive to said selected warp pattern for displacing the pixels of the array by selected very slight local spatial amounts while maintaining each pixel in the displaced pixels within the same set of pixels originally contiguous therewith to maintain the compression process compatibility.

22. The apparatus of claim 15 wherein the video data comprises a two-dimensional array of pixels and contains a fingerprint corresponding to the specific information being conveyed, and is selectively delivered to the receiving facility which includes:

means for detecting the spatial placements of the pixels in the original video data versus the corresponding very slight local spatial displacements of the pixels in an illicit copy of the fingerprinted video data; and means for comparing the pixel displacements with a plurality of warp patterns to determine the identity of the corresponding fingerprint and thus of the illicit copy.

23. Apparatus for conveying specific information in video data by fingerprinting the video data and the like, comprising:

a field/frame store for providing a field or frame of the video data;

a code generator for generating a warp pattern select code;

a memory for supplying a selected warp pattern corresponding to the specific information contained in a respective fingerprint in response to the warp pattern select code;

a circuit for applying the fingerprint to the field or frame of video data by locally slightly displacing individual portions of the field or frame from their normal locations in response to the selected warp pattern, wherein the fingerprint is not noticeable to a viewer but is detectable electronically;

wherein the pattern of the fingerprint is compatible with signal compression processes; and means for delivering the fingerprinted video data to a receiving facility, said fingerprint conveying to the receiving facility the specific information pertinent to the field or frame of video data.

24. The apparatus of claim 23 wherein:

the memory means includes a lookup table of a multiplicity of warp patterns each of which imparts a different pattern of distortion representing a different specific information; and the circuit includes a warp engine for locally slightly displacing the individual portions in accordance with the respective selected warp pattern.

25. The apparatus or claim 23, including:

means integral with the receiving means for detecting the fingerprint in the field or frame of video data; and means responsive to the detecting means for preventing copying of the fingerprinted video data.

26. The apparatus of claim 23, including:

means for detecting the local slight spatial displacements in the individual portions of an illicit copy of the fingerprinted field or frame relative to the unfingerprinted field or frame of the original video data; and means responsive to the detecting means for comparing the local slight spatial displacements with a multiplicity of warp patterns to identify the specific warp pattern used and thus identify the illicit copy of the video data.

27. A method of conveying specific information in selected data such as video data, computer generated data and/or photographs, by the insertion of a fingerprint in the selected data, comprising the steps of:

supplying a representation of said selected data;

storing a selected plurality of warp patterns commensurate with different very slight local spatial distortions representative of a respective plurality of fingerprints;

selecting a warp pattern which identifies the specific information to be conveyed from said stored plurality of warp patterns;

locally slightly spatially displacing individual portions of said representation of said selected data from their normal locations in response to said selected warp pattern to embed the corresponding fingerprint specific information within the selected data without degrading the watchability of the selected data; and detecting the fingerprint specific information in the conveyed selected data to recover the specific information inserted therein.

28. The method of claim 27 wherein the fingerprinted selected data is selectively delivered to a receiving facility, including the steps of:

detecting the fingerprint specific information by comparing the locally slightly spatially displaced individual portions with the normal locations in the original selected data; and preventing the copying of the fingerprinted selected data in response to the detected fingerprint specific information embedded within the selected data.

29. The method of claim 27 wherein the fingerprinted selected data is selectively delivered to a receiving facility, including the steps of:

detecting the slight spatial displacement in the representation of an illicit copy of the fingerprinted selected data relative to the representation of the corresponding unfingerprinted original selected data; and comparing the slight spatial displacement with the plurality of warp patterns to determine the identity of the corresponding fingerprint specific information and thus of the illicit copy of the selected data.

30. A method of conveying information in selected data by fingerprinting the selected data, wherein the selected data may include analog or digital video data, computer generated data and/or photographs, comprising the steps of:

supplying a representation of said selected data to a first input of a warp engine;

storing a selected plurality of warp patterns, commensurate with a respective plurality of fingerprints, in a warp pattern library, wherein each warp pattern represents a different piece of information being conveyed with a respective representation;

generating a pattern select code indicative of a specific warp pattern to be applied to the selected data:

selecting the specific warp pattern from said stored plurality of patterns in the library in response to the pattern select code;

supplying said selected specific warp pattern to a second input of said warp engine to locally very slightly spatially displace selected portions of said representation an amount which is insufficient to be noticeable to a viewer, wherein said fingerprint conveys the different piece of information within the selected data which is electronically detectable although not noticeable to the viewer, wherein the very slight spatial displacements are compatible with signal compression processes;

detecting the fingerprint in the respective representation of the selected data; and determining the different piece of information represented by the detected fingerprint.

31. The method of claim 30 including the steps of:

delivering the fingerprinted selected data to a receiving facility;

wherein the steps of detecting and determining include comparing the very slight spatial displacements with corresponding placements of the original representation of the selected data; and applying the detected piece of information to prevent copying of the fingerprinted selected data and/or to identify a source of an unauthorized copy of the selected data.

* * * * *

UNITED STATES PATENT AND TRADEMARK OFFICE
CERTIFICATE OF CORRECTION

PATENT NO. : 6,381,367 B1
DATED : April 30, 2002
INVENTOR(S) : John Ryan

It is certified that error appears in the above-identified patent and that said Letters Patent is hereby corrected as shown below:

Column 4,
Line 57, after "convey" insert -- instructions to a device such as, for example, a video recording device. The presence of the warp pattern may be used to instruct the recording device to not copy that particular program carrying the warp pattern. For this application, it is desirable that the warp pattern vary over time at a rate just enough to facilitate detection, but not so fast as to cause visible change in the picture when viewed by critical viewers. Clearly, if the warp pattern is fixed in time it will be difficult or impossible to detect it without reference to the unwarpped image because of its subtle nature and because normal geometrical distortions in the camera or picture origination device may generate "natural" warp patterns.

In this latter application the detector is designed to look for small changing geometrical distortions of the image which follow a pre-ordained pattern. In the presence of rapidly changing scenes the detector would not be expected to work reliably. However, most programs contain periods of little scene change when reliable unambiguous detection becomes feasible. For copy protection applications, for example, it would not matter if the detection process took several minutes to make an unambiguous decision that the program is not to be copied. --

Column 5,
Line 4, replace "wrap" with -- warp --
Between lines 11 and 12, insert -- FIGs. 1 and 2 illustrate an original picture or video image without a fingerprint and a video image with the addition of a fingerprint, respectively, in accordance with the present invention. As may be seen in FIG. 2, the application of a warp pattern does not cause a visually noticeable distortion in the image.
In this embodiment, the fact that the video has undergone varying spatial image distortion according to some pre-arranged pattern and/or timetable can be used to instruct a video recorder not to copy this video, for example A special detector circuit in a video recorder makes a determination that the video has been fingerprinted according to the prearranged pattern and generates a "don't copy" command.
Lines 21-67, delete.

UNITED STATES PATENT AND TRADEMARK OFFICE
CERTIFICATE OF CORRECTION

PATENT NO. : 6,381,367 B1
DATED : April 30, 2002
INVENTOR(S) : John Ryan

It is certified that error appears in the above-identified patent and that said Letters Patent is hereby corrected as shown below:

Column 6,
Lines 1-6, delete.
Line 9, insert -- 30 -- after "motion detector"
Line 11, insert -- via a motion director 32 -- before "to the video"
Line 11, insert -- which is then -- after "video"
Line 16, change "then" to -- thus --
Line 19, after "examined" insert -- in a comparator 36 --
Line 20, change "the" (first occurrence) to -- reference --
Line 24, delete "one" after "In"

Signed and Sealed this

Fifth Day of August, 2003

JAMES E. ROGAN
*Director of the United States Patent and Trademark Office*